United States Patent
Zhuravlev

(10) Patent No.: US 11,846,381 B2
(45) Date of Patent: Dec. 19, 2023

(54) METHOD OF RESTORING A TUBULAR ASSEMBLY

(71) Applicant: VAMMI S.r.l., Trento (IT)

(72) Inventor: Alexey Zhuravlev, Trento (IT)

(*) Notice: Subject to any disclaimer, the term of this patent is extended or adjusted under 35 U.S.C. 154(b) by 6 days.

(21) Appl. No.: 17/666,296

(22) Filed: Feb. 7, 2022

(65) Prior Publication Data
US 2023/0204145 A1 Jun. 29, 2023

(30) Foreign Application Priority Data
Dec. 23, 2021 (IT) .................... 102021000032564

(51) Int. Cl.
*F16L 55/165* (2006.01)
*F16L 51/02* (2006.01)
*F16L 55/16* (2006.01)

(52) U.S. Cl.
CPC ......... *F16L 55/1657* (2013.01); *F16L 51/022* (2013.01); *F16L 55/16* (2013.01)

(58) Field of Classification Search
CPC ....... F16L 23/12; F16L 23/125; F16L 23/162; F16L 25/0018; F16L 27/1012; F16L 27/1025; F16L 51/027; F16L 55/1657; F16L 58/08; F16L 58/1036; F16L 25/12; F16L 51/02; F16L 51/022; F16L 55/16; F16L 55/165; F16L 57/005; F16L 57/06; E03F 2003/065
See application file for complete search history.

(56) References Cited

U.S. PATENT DOCUMENTS

| | | | | |
|---|---|---|---|---|
| 1,889,868 A | * | 12/1932 | Montgomery | E21B 17/042 285/299 |
| 2,406,234 A | * | 8/1946 | Marancik | F16L 51/027 285/227 |
| 2,862,729 A | * | 12/1958 | Bredtschneider | F16L 13/06 285/364 |
| 3,068,026 A | * | 12/1962 | McKamey | F16L 39/005 62/50.7 |
| 3,082,795 A | * | 3/1963 | Heller | F16L 27/111 138/121 |
| 3,142,499 A | * | 7/1964 | Lang | F16L 58/184 285/379 |

(Continued)

FOREIGN PATENT DOCUMENTS

WO 9320381 10/1993
WO 2006020960 2/2006

OTHER PUBLICATIONS

Italian Patent and Trademark Office, Search Report, dated Jul. 25, 2022.

*Primary Examiner* — Robert K Arundale
*Assistant Examiner* — Richard K. Durden
(74) *Attorney, Agent, or Firm* — Themis Law

(57) ABSTRACT

A method of restoring a tubular assembly having a plurality of coupled tubular bodies includes the steps of inserting a first tubular element and a second tubular element inside the tubular assembly, the first tubular element having a first free end facing a second free end of the second tubular element, and of pushing at least one of the first or second tubular element against the other so as to bring the first free end and the second free end into contact. Before the step of inserting, there is a step of producing a collar on at least the first free end of the first tubular element.

10 Claims, 3 Drawing Sheets

(56) References Cited

U.S. PATENT DOCUMENTS

| | | | | |
|---|---|---|---|---|
| 3,188,116 | A | * | 6/1965 | Christensen .......... F16L 23/162 285/47 |
| 3,210,102 | A | | 10/1965 | Earl |
| 3,239,250 | A | * | 3/1966 | Fonda-Bonardi ....... F16L 23/12 285/329 |
| 3,549,780 | A | * | 12/1970 | Graneau ................ H01R 35/02 174/12 R |
| 3,692,337 | A | * | 9/1972 | Mischel ................ F16L 27/111 285/299 |
| 3,823,249 | A | * | 7/1974 | Floessel ................ H02G 5/063 174/21 C |
| 3,932,922 | A | * | 1/1976 | Thastrup ................... F16L 1/00 29/446 |
| 4,117,201 | A | * | 9/1978 | Keifert .................... F16L 58/18 138/DIG. 6 |
| 4,166,479 | A | * | 9/1979 | Cleavenger ......... F16L 55/1657 285/55 |
| 4,243,253 | A | * | 1/1981 | Rogers, Jr. ............. F16L 27/111 285/123.17 |
| 4,336,958 | A | * | 6/1982 | Goetzinger ........... F16L 58/187 138/DIG. 6 |
| 4,447,076 | A | * | 5/1984 | Evans .................... F16L 57/06 285/55 |
| 4,515,397 | A | * | 5/1985 | Nowobilski ........... F16L 59/16 285/47 |
| 4,810,008 | A | * | 3/1989 | Brodie ................ F16L 55/1608 285/133.4 |
| 4,854,611 | A | * | 8/1989 | Press ...................... F16L 27/111 285/226 |
| 5,141,256 | A | * | 8/1992 | Ziu ....................... F16L 39/005 285/284.1 |
| 5,316,352 | A | | 5/1994 | Smith |
| 5,779,285 | A | * | 7/1998 | Robison ................. F16L 21/08 285/348 |
| 6,533,334 | B1 | * | 3/2003 | Bonn .................... F16L 59/141 285/904 |
| 7,861,743 | B1 | * | 1/2011 | Wren ...................... F16L 57/06 405/184.2 |
| 9,243,711 | B2 | * | 1/2016 | Silveira .................. F16L 17/08 |
| 2006/0001258 | A1 | * | 1/2006 | Kamiyama ......... F16L 55/1657 285/15 |
| 2013/0249207 | A1 | * | 9/2013 | Wiedenmann .......... F16L 51/02 285/45 |
| 2014/0096855 | A1 | | 4/2014 | Kamiyama |
| 2016/0238174 | A1 | * | 8/2016 | Farr ...................... F16L 51/025 |

* cited by examiner

METHOD OF RESTORING A TUBULAR ASSEMBLY

FIELD OF THE INVENTION

The present invention is applicable to the technical field related to the construction of pipes for conveying fluids and, in particular, relates to a method of restoring a tubular assembly and a restored tubular assembly.

BACKGROUND OF THE INVENTION

It often occurs that after decades of use, the inner surface of pipes for conveying fluids is subject to wear and therefore there is a need to proceed with their replacement. However, it is known that in some situations it is not easy to proceed with the complete replacement of the pipes, also given the need to proceed with the subsequent disposal thereof.

For this reason, in the prior art, particular tubular lining elements, typically made of plastic material, are often used. In particular, these are pipes whose outer diameter is equal to, or slightly greater than, the inner diameter of the pipe to be lined, and which, in order to allow their insertion in the worn pipe, are elastically deformed through the formation of a bend inwards along the entire length of the tubular lining elements. Once inserted in the pipe to be lined, the tubular lining element, by virtue of the elasticity of the plastic material of which it is composed, recovers the cylindrical shape expanding to adhere to the inner walls of the pipe to be replaced.

However, this technique has some recognized drawbacks.

In fact, the plastic material of the tubular lining element is not suitable for all types of fluids, in particular abrasive or corrosive ones.

In order to overcome the aforesaid drawbacks, it is therefore known to use tubular lining elements in metallic material, which are known to be more resistant.

However, since metal has a very high stiffness with respect to plastic material, the tubular lining element must have a slightly smaller outer diameter with respect to the inner diameter of the pipe to be lined in order to allow its insertion in the latter.

Subsequently, following insertion, a pressurized fluid is introduced inside the tubular lining element which causes a plastic deformation in the radial direction, until it is compressed against the inner surface of the pipe to be lined.

However, such a technique also has some recognized drawbacks.

In particular, the tubular lining elements are joined together by joints which are not always easy to assemble.

Moreover, with the joints of the prior art, the tubular lining elements are assembled by screwing or by means of a sealing coupling system which deliberately does not allow fluid to exit. This causes even considerable pressure differences sometimes between the inside and the outside of the tubular lining element, especially at joints between pipes to be lined. In such circumstances, in fact, there is an air chamber of relatively substantial size which emphasizes the phenomenon with a strong risk of rupture of the tubular lining elements.

Furthermore, the aforesaid joints give rise to sometimes very accentuated irregularities on the inner surface of the tubular lining elements, generating turbulence in the fluid which passes through them. Such turbulence not only hinders proper fluid flow, but further increases the above-mentioned pressure differences.

Lastly, the same construction of the joints, whether by screwing or coupling, causes a considerable expenditure of money. Moreover, the assembly between the pipes provided with the joints of the known art is rather time-consuming.

SUMMARY OF THE INVENTION

The object of the present invention is to at least partially overcome the drawbacks highlighted above by providing a method of restoring a tubular assembly and a restored tubular assembly which ensure the strength of the tubular lining elements.

In particular, an object of the present invention is to provide a method of restoring a tubular assembly, and a tubular assembly thus obtained, which allow the tubular assembly thus restored to resist in case of use with corrosive or abrasive fluids.

Another object of the present invention is to provide a method of restoring a tubular assembly which allows the tubular lining elements to be quickly assembled.

In particular, an object of the present invention is that the joint between tubular lining elements is easily obtainable.

It follows that another object of the present invention is to provide a tubular assembly and a method of restoring the same which allows cost savings in the construction of the joint element.

A further object of the present invention is to provide a method of restoring a tubular assembly and a tubular assembly obtained with the same which allows reducing, if not eliminating, the risk of pressure differences between the inside and outside of the tubular lining element.

Moreover, another object of the present invention is to provide a restored tubular assembly which allows to avoid the risk of rupture of the pipes caused by such pressure differences.

Said objects, as well as others which will become clearer below, are achieved by a method of restoring a tubular assembly in accordance with the following claims, which are to be considered as an integral part of the present patent.

In particular, the method of restoring a tubular assembly comprising one or more tubular bodies in use coupled together, comprises a step of inserting at least a first tubular element and at least a second tubular element inside the tubular assembly. In particular, during this step, according to an aspect of the invention, the first tubular element has a first free end facing a second free end of the second tubular element.

The restoration method of the invention further comprises a step of pushing at least one of the first tubular element and the second tubular element against the other, so as to bring the first free end and the second free end into contact.

According to an aspect of the invention, the method comprises, before the insertion step, a step of producing, at least on the first tubular element, a collar with transverse extension with respect to the longitudinal extension axis of the first tubular element, arranged at least at the first free end and identifying an annular contact surface. In one embodiment, the annular contact surface may be flat. In one embodiment, the collar may be produced by deforming the tubular element; in another embodiment, the collar may be produced by welding or anyway permanently affixing a collar on the tubular element.

Moreover, still advantageously, what is mentioned above allows to create as linear a path as possible for a fluid through the tubular assembly avoiding the formation of at least significant turbulence.

Still advantageously, what has been said, in addition to favoring the correct outflow of the fluid, further limits the occurrence of pressure changes.

Furthermore, the presence of the collar, still advantageously, allows a rapid assembly of the tubular lining elements. In fact, for this purpose it will be sufficient to insert the first tubular element and the second tubular element and push them towards each other longitudinally.

Moreover, the presence of the collar having a contact surface still allows, advantageously, to increase the centering space of the second tubular element, even if it does not in turn have a collar at the free end facing the first tubular element.

The creation of the collar itself requires less machining with respect to the joints of the prior art, thus leading, advantageously, to considerable cost savings.

From what has been stated thus far, it is evident that said objects are also achieved by a tubular assembly, comprising:
one or more tubular bodies in use coupled together for conducting fluids
at least a first tubular element and at least a second tubular element, the first tubular element having a first free end facing a second free end of the second tubular element, and which is characterized in that at least the first tubular element comprises at least one transversely extending collar arranged at least at the first free end and identifying an annular contact surface so as to allow a contact between the first free end and the second free end and to create a linear path for a fluid through the tubular assembly.

BRIEF DESCRIPTION OF THE DRAWINGS

Further features and advantages of the invention will be more apparent in light of the detailed description of some preferred, but not exclusive, embodiments of a method of restoring a tubular assembly and a tubular assembly according to the invention, illustrated by way of non-limiting example with the aid of the accompanying drawing tables, in which.

DETAILED DESCRIPTION OF EMBODIMENTS OF THE INVENTION

Figure 1:
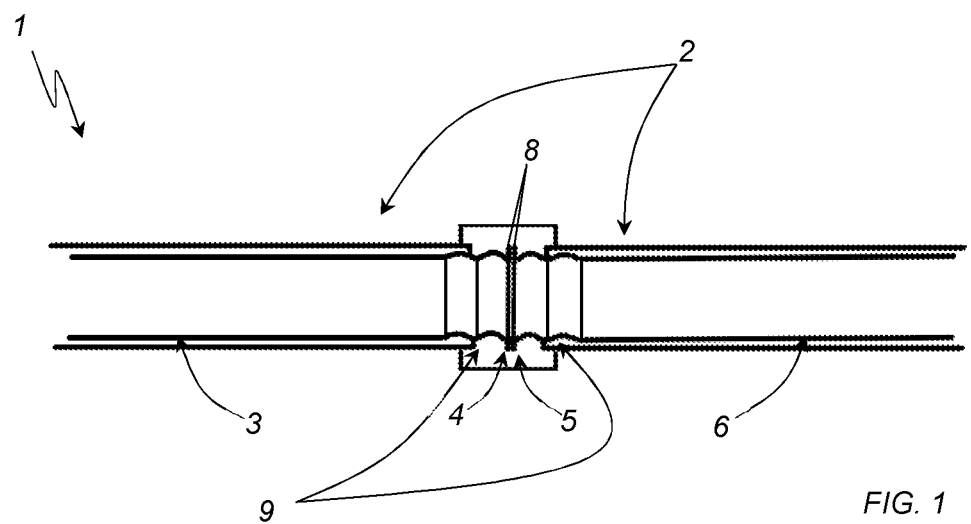
FIG. 1 depicts a tubular assembly according to the invention in a sectioned front view.
Figure 2:
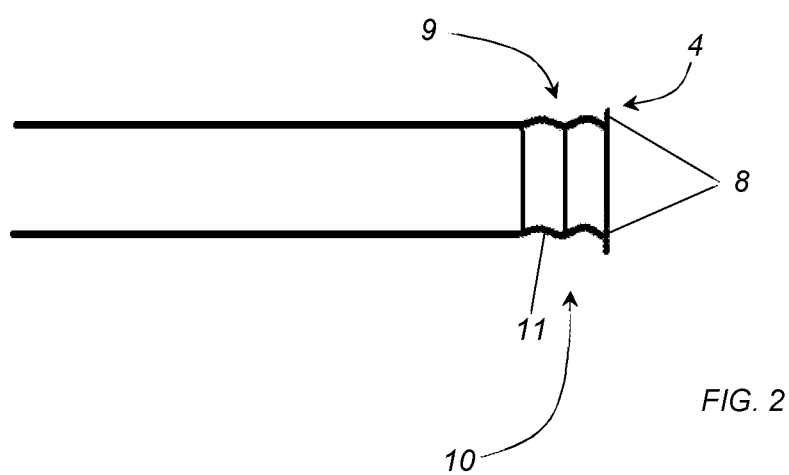
FIG. 2 depicts a detail of the tubular assembly of the invention.

With reference to the aforementioned figures, a tubular assembly 1 according to the invention is described. In particular, the tubular assembly 1 comprises two tubular bodies 2 in use coupled together for conducting fluids. Such tubular bodies 2 are typically but not necessarily deteriorated and should therefore be subject to extraordinary maintenance. This, however, should not be considered as limiting for the invention, the present assembly 1 also being suitable for the conversion of tubular bodies for use with different fluids.

In this sense, the tubular assembly 1 of the invention comprises a first tubular element 3 having a first free end 4 facing a second free end 5 of a second tubular element 6. The first tubular element 3 and the second tubular element 6 are arranged inside the tubular assembly 1. Obviously, the foregoing should not be considered as limiting for different embodiments of the invention according to which there is a single tubular body or more than two tubular bodies. The same goes for tubular elements which can be in any number.

According to an aspect of the invention, the first tubular element 3 and the second tubular element 4 each comprise a transversely extending collar 8, arranged at the first free end 4 and the second free end 5, respectively. However, such an aspect should not be considered as limiting for different embodiments of the invention according to which only one between the first and the second tubular element comprises a collar.

More in detail, the joint obtained with the collar 8 allows to make a contact between the pipes without however obtaining a sealing joint. Thereby, advantageously, the fluid passing through the tubular elements is able to draw outwards, rebalancing or even eliminating the pressure differences which could otherwise occur. In fact, as it is known, in the case of restored tubular assemblies, it may occur that a pressure difference is created between the inside and outside of the lining pipe due to the fact that the joints of the prior art obtain a conjunction between sealed tubular elements which prevents the exit of fluids from the joints themselves. Moreover, the pressure difference can be greater at the joint between tubular bodies in use and deteriorated, precisely because of the greater space which exists between the inner surface of the joint and the outer surface of the tubular lining element. In all such cases, the absence of cracks which allow a part of fluid to exit from the tubular lining element can, by virtue of the high pressure difference, cause the pipes themselves to rupture.

For these reasons, the presence of the collar 8 allows a non-sealing joint between the tubular elements 3 and 6, thus allowing fluid leaks which allow to reduce the pressure difference between the inside and outside thereof.

It follows, advantageously, that the risk of breakage of the tubular assembly 1 is reduced, if not eliminated.

Moreover, the joint obtained with the collar 8 does not generate significant irregularities on the inner surface of the tubular elements 3 and 6, unlike what occurs with the joints of the prior art.

This allows the fluid to advantageously flow inside the tubular assembly 1 without encountering obstacles. It follows that, still advantageously, the possibility of generating significant turbulence is reduced which would not only hinder the correct outflow of the fluid, but would accentuate the pressure differences between the inside and the outside of the tubular lining elements.

It should be added, still advantageously, that the fact that a minimum pressure difference if not zero pressure difference is maintained between the inside and the outside of the tubular elements 3 and 6 and that therefore they do not have to withstand considerable pressure differences, allows to make the tubular elements 3 and 6 with less noble materials.

It follows, still advantageously, that what has been said allows cost savings.

According to an aspect of the invention, the collar 8 identifies an annular contact surface. This advantageously makes it possible to increase the centering space of the second tubular element 6 with respect to the first tubular element 3 even if, according to different embodiments, the second tubular element does not in turn comprise a collar at the second free end facing the first tubular element.

Moreover, still advantageously, by virtue of the foregoing, the presence of the collar 8 allows a faster assembly between the first tubular element 3 and the second tubular element 6, since, as will be seen later, in order to join the tubular elements 3 and 6 the user will simply have to push them against each other in a longitudinal direction.

According to a further aspect of the invention, the collar 8 is made in a single body with the tubular elements 3 and 6, that is, is monolithic therewith, without however constituting a limit for the present invention.

Advantageously, obtaining the collar 8 in a single body with the tubular elements 3 and 6 requires less machining with respect to the joints of the prior art, thus leading to considerable cost savings.

It should also be added that the collar 8 ensures a mechanical resistance to transverse impacts which would result in a deformation of the free ends 4 and 5.

As mentioned, the embodiment described thus far should not be considered as limiting for the invention.

Figure 3:
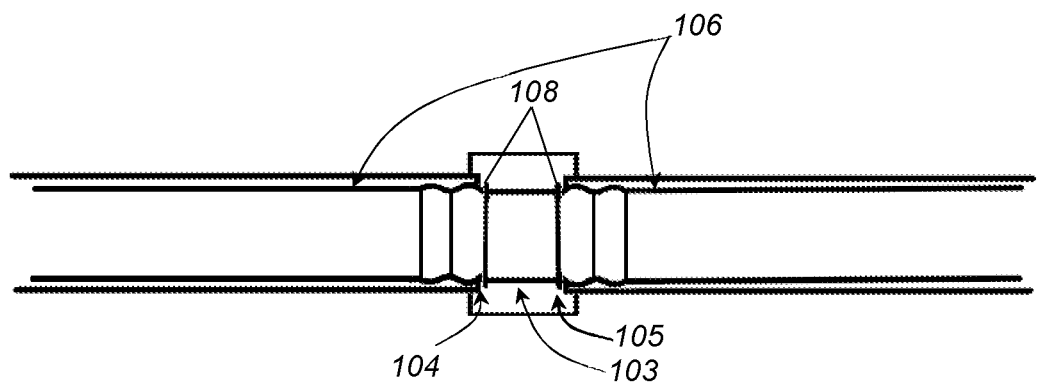
FIGS. 3 and 4 depict an embodiment of the tubular assembly of FIG. 1.
Figure 4:
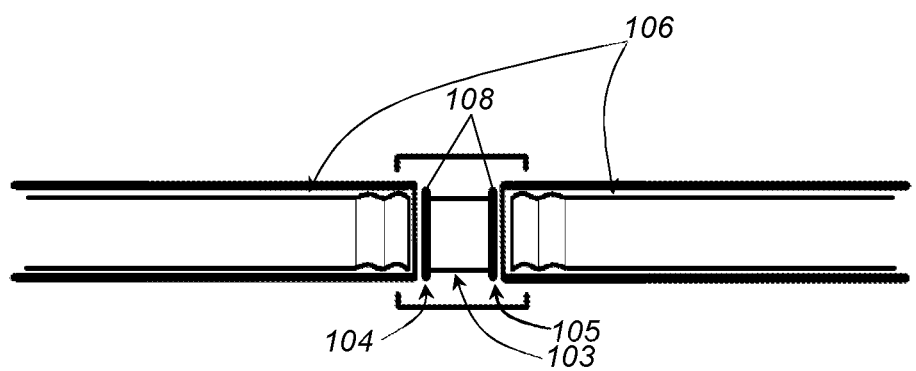
Figure 5:
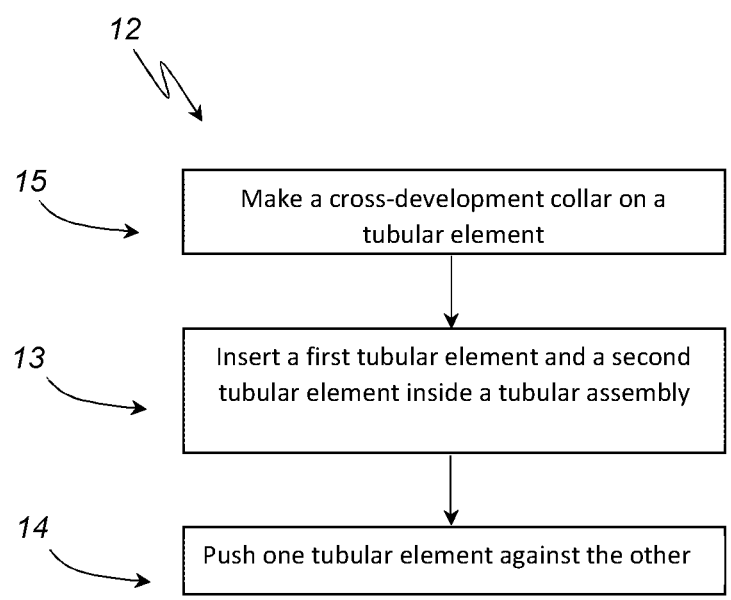
FIG. 5 depicts a block diagram of the restoration method of the invention.

In fact, according to an embodiment of the invention depicted in FIG. 3, the first tubular element 103 is interposed between two second tubular elements 106 and has the first free end 104 and the second free end 105 both provided with the collar 108. As can be seen from FIG. 3, the second tubular elements 106 are not provided with a collar at the free end facing the first tubular element 103.

According to another aspect of the invention, an end portion 9 of the first tubular element 3 and the second tubular element 4 comprises a shaping 10, however without this feature constituting a limit for the present invention. In particular, as shown in the figures, the end portions 9 comprise a plurality of annular narrowings 11. However, such an aspect must not be considered as limiting for different embodiments of the invention according to which there is only one narrowing.

Advantageously, the presence of the shaping 10 allows to adapt the length of the tubular elements 3 and 6 according to needs. In fact, as will be seen below, after inserting the tubular elements 3 and 6 inside the tubular assembly 1, the user exerts a longitudinal pressure with respect thereto. If the tubular elements 3 and 6 are too long, it will be sufficient to exert a stronger longitudinal pressure to make them yield in an "accordion"-like manner until reaching the desired length.

Moreover, still advantageously, the presence of the shaping 10 allows to make the first tubular element 3 and the second tubular element 6 more resistant to impacts.

According to a further aspect of the invention, the first tubular element 3 and the second tubular element 6 are made of metallic material. This allows, advantageously, to have tubular elements 3 and 6 resistant to any type of fluid, even those which are corrosive and abrasive.

However, the foregoing must not constitute any limit for the present invention, since the tubular elements can be made of any material.

Operatively, the tubular assembly 1 of the invention is obtained through the restoration method 12 of a tubular assembly 1 of the invention. In particular, the method of the invention comprises a first insertion step 13 of the first tubular element 3 and the second tubular element 6 inside the tubular assembly 1, the first tubular element 3 having the first free end 4 facing the second free end 5 of the second tubular element 6.

Next, there is a step indicated with 14 in which the user must push the first tubular element 3 and the second tubular element 6 against each other so as to bring the first free end 4 into contact with the second free end 5.

According to an aspect of the invention, the method comprises, before the insertion step 13, a production step 15 of the collar 8 at the first free end 4 and the second free end 5 of the two tubular elements 3 and 6.

In particular, as previously mentioned, the contact between the two collars 8 creates a joint between the two tubular elements 3 and 6. More specifically, the two collars 8 identify an annular contact surface which advantageously allows to increase the centering space of the second tubular element 6 with respect to the first tubular element 3.

The rapidity of assembly between the first tubular element 3 and the second tubular element 6 is also evident, since in order to join the tubular elements 3 and 6 the user has merely pushed them against each other as indicated in step 14.

According to another aspect of the invention, the restoration method 12 of a tubular assembly 1 comprises, before the insertion step 13, a step of shaping (or additionally shaping) an end portion 9 of the first tubular element 3 and of the second tubular element 6. In particular, in the embodiment described and depicted herein, the end portions 9 comprise a plurality of narrowings 11. However, such an aspect must not be considered as limiting for different embodiments of the invention according to which there is only one narrowing.

Advantageously, making the shaping 10 allows, as mentioned, to adapt the length of the tubular elements 3 and 6 according to needs. In fact, during the pushing step 14, the user exerted exerts a pressure in a longitudinal direction with respect thereto. In this sense, while in the prior art the user must proceed with the custom cutting of the tubular elements, with the tubular assembly 1 of the invention it is sufficient for him to exert a stronger pressure in order to make the tubular elements 3 and 6 yield in an "accordion"-like manner.

In light of the foregoing, it is understood that the tubular assembly of the invention achieves the intended objects.

In particular, the tubular assembly ensures the strength of the tubular lining elements.

In fact, it resists when used with corrosive or abrasive fluids.

Furthermore, the restoration method thereof allows the tubular lining elements to be quickly assembled.

Moreover, the tubular assembly of the invention allows cost and time savings in the creation of the joint element.

Further, the method of restoring a tubular assembly and a tubular assembly obtained therewith allows reducing, if not eliminating, the risk of pressure differences between the inside and the outside of the tubular lining element.

It follows that the tubular assembly restored with the method of the invention allows to avoid the risk of rupture of pipes caused by pressure differences.

The invention might be subject to many changes and variants, which are all included in the appended claims. Moreover, all the details may furthermore be replaced by other technically equivalent elements, and the materials may be different depending on needs, without departing from the protection scope of the invention defined by the appended claims.

The invention claimed is:

1. A method of restoring a tubular assembly comprising one or more tubular bodies for conducting a fluid, the method comprising the following steps:
   inserting a first tubular element and a second tubular element inside the tubular assembly, the first tubular element having a first free end facing a second free end of the second tubular element; and
   pushing at least one of the first tubular element or the second tubular element against the other so as to bring the first free end of the first tubular element and the second free end of the second tubular element into contact, further comprising, before the step of inserting, a step of producing, on at least one of the first tubular element or the second tubular element, a collar having a transverse outward extension, the collar being arranged at the first free end of at least one of the first tubular element or the second tubular element and defining a flat annular contact surface without a sealing joint between the first tubular element and the second tubular element.

2. The method according to claim 1, further comprising, before the step of inserting, a step of further shaping an end portion of at least one of the first tubular element or the second tubular element.

3. The method according to claim 2, wherein the step of further shaping comprises producing of at least one annular narrowing in the end portion.

4. A tubular assembly comprising:
one or more tubular bodies for conducting a fluid; and
a first tubular element and a second tubular element arranged within the one or more tubular bodies, the first tubular element having a first free end facing a second free end of the second tubular element,
wherein at least one of the first tubular element or the second tubular element comprises a collar having a transverse outward extension, the collar being arranged at an end portion of the at least one of the first tubular element or the second tubular element and defining a flat annular contact surface without a sealing joint between the first tubular element and the second tubular element.

5. The tubular assembly according to claim 4, wherein one or both of the first tubular element or the second tubular element further comprises a bellows-shaped portion defined in the end portion, the bellows-shaped portion being adjacent to the collar when the collar is present.

6. The tubular assembly according to claim 5, wherein the bellows-shaped portion has a single annular narrowing.

7. The tubular assembly according to claim 4, wherein the collar is monolithic with the first tubular element or the second tubular element.

8. The tubular assembly according to claim 4, wherein the first tubular element and the second tubular element are made of a metallic material.

9. A tubular assembly comprising:
one or more tubular bodies for conducting a fluid;
a first tubular element and a second tubular element arranged within the one or more tubular bodies; and
a third tubular element interposed between the first tubular element and the second tubular element, a first annular collar and a second annular collar each having a transverse outward extension being defined at respective free ends of the third tubular element,
wherein the first annular collar and the second annular collar each define a flat annular contact surface without a sealing joint between the third element and a respective one of the first tubular element or the second tubular element.

10. The tubular assembly according to claim 9, wherein one or both of the first tubular element or the second tubular element further comprises a bellows-shaped portion defined in an end portion of the first tubular element or the second tubular element.

* * * * *